(12) United States Patent
Kumar et al.

(10) Patent No.: US 9,031,809 B1
(45) Date of Patent: May 12, 2015

(54) METHOD AND APPARATUS FOR GENERATING THREE-DIMENSIONAL POSE USING MULTI-MODAL SENSOR FUSION

(75) Inventors: Rakesh Kumar, West Windsor, NJ (US); Supun Samarasekera, Princeton, NJ (US); Han-Pang Chiu, Princeton, NJ (US); Zhiwei Zhu, Princeton, NJ (US); Taragay Oskiper, East Windsor, NJ (US); Lu Wang, Plainsboro, NJ (US); Raia Hadsell, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 932 days.

(21) Appl. No.: 13/182,987

(22) Filed: Jul. 14, 2011

Related U.S. Application Data

(60) Provisional application No. 61/364,160, filed on Jul. 14, 2010, provisional application No. 61/376,771, filed on Aug. 25, 2010.

(51) Int. Cl.
*G01C 21/16* (2006.01)
*G06T 7/00* (2006.01)
*G06F 3/01* (2006.01)
*G01C 21/00* (2006.01)
*G06K 9/00* (2006.01)
*G01S 1/00* (2006.01)

(52) U.S. Cl.
CPC ............. *G01C 21/165* (2013.01); *G06T 7/0044* (2013.01); *G06T 7/0075* (2013.01); *G06F 3/012* (2013.01); *G01C 21/005* (2013.01); *G06T 7/0042* (2013.01); *G06K 9/00671* (2013.01); *G01S 1/00* (2013.01)

(58) Field of Classification Search
CPC .. G01C 21/165; G01C 21/005; G06T 7/0042; G06T 7/0044; G06T 7/0075; G06K 9/00671; G01S 1/00; G06F 3/012
See application file for complete search history.

(56) References Cited

U.S. PATENT DOCUMENTS

| | | | |
|---|---|---|---|
| 8,370,064 B1 * | 2/2013 | Li et al. | 701/479 |
| 2005/0008256 A1 * | 1/2005 | Uchiyama et al. | 382/291 |
| 2006/0221072 A1 * | 10/2006 | Se et al. | 345/420 |
| 2007/0118286 A1 * | 5/2007 | Wang et al. | 701/213 |

(Continued)

OTHER PUBLICATIONS

Roumeliotis et al., "Circumventing Dynamic Modeling: Evaluation of the Error-State Kalman Filter applied to Mobile Robot Localization" Proceedings of the 1999 IEEE International Conference on Robotics & Automation Detroit, Michigan May 1999, pp. 1656-1663.*

(Continued)

*Primary Examiner* — Mohamed Charioui
*Assistant Examiner* — John Kuan
(74) *Attorney, Agent, or Firm* — Moser Taboada

(57) ABSTRACT

A method and apparatus for providing three-dimensional navigation for a node comprising an inertial measurement unit for providing gyroscope, acceleration and velocity information (collectively IMU information); a ranging unit for providing distance information relative to at least one reference node; at least one visual sensor for providing images of an environment surrounding the node; a preprocessor, coupled to the inertial measurement unit, the ranging unit and the plurality of visual sensors, for generating error states for the IMU information, the distance information and the images; and an error-state predictive filter, coupled to the preprocessor, for processing the error states to produce a three-dimensional pose of the node.

14 Claims, 8 Drawing Sheets

(56) References Cited

U.S. PATENT DOCUMENTS

| | | | |
|---|---|---|---|
| 2008/0167814 A1* | 7/2008 | Samarasekera et al. | 701/213 |
| 2010/0103196 A1* | 4/2010 | Kumar et al. | 345/633 |
| 2011/0079703 A1* | 4/2011 | Gunning et al. | 250/206.2 |
| 2011/0135207 A1* | 6/2011 | Flynn et al. | 382/209 |
| 2011/0313716 A1* | 12/2011 | Smid et al. | 702/141 |

OTHER PUBLICATIONS

Roumeliotis et al., "Smoother based 3D Attitude Estimation for Mobile Robot Localization" Proceedings of the 1999 IEEE International Conference on Robotics & Automation Detroit, Michigan May 1999, pp. 1979-1986.*

Roumeliotis et al., "Augmenting Inertial Navigation with Image-Based Motion Estimation" Proceedings of the 2002 IEEE International Conference on Robotics & Automation.*

"Multi-Modal Sensor Fusion Algorithm for ubiquitous Infrastructure-free Localization in Vision-impaired Environments" Taragay Oskiper, Han-Pang Chiu, Zhiwei Zhu, Supun Samarasekera, Rakesh Kumar, The 2010 IEEE/RSJ International Conference on Intelligent Robots and Systems, Oct. 18-22, 2010, Taipei, Taiwan, pp. 1513-1519.

* cited by examiner

METHOD AND APPARATUS FOR GENERATING THREE-DIMENSIONAL POSE USING MULTI-MODAL SENSOR FUSION

CROSS-REFERENCE TO RELATED APPLICATIONS

This application claims benefit of United States provisional patent applications Ser. No. 61/364,160, filed Jul. 14, 2010, and Ser. No. 61/376,771, filed Aug. 25, 2010, both of which are herein incorporated in their entireties by reference.

GOVERNMENT RIGHTS IN THIS INVENTION

This invention was made with U.S. government support under contract number FA9200-07-D-0045. The U.S. government has certain rights in this invention.

BACKGROUND OF THE INVENTION

1. Field of the Invention

Embodiments of the present invention generally relate to navigation techniques and, more particularly, to a method and apparatus for generating three-dimensional pose using multi-modal sensor fusion.

2. Description of the Related Art

Real-time navigation systems generally rely upon Global Positioning System (GPS) receivers to provide position information. Such systems, by their reliance on satellite signals, are impaired when operating indoors. In an effort to overcome this impairment, multiple sensors for providing navigation information when GPS signals are unavailable have been developed. Real-time tracking by fusing information available from visual and inertial sensors (e.g., an inertial measurement unit (IMU)) has been studied for many years with numerous applications in robotics, vehicle navigation and augmented reality. However, it is still unclear how to best combine the information from these complementary sensors. Since inertial sensors are suited for handling situations where vision is lost due to fast motion or occlusion, many researchers use inertial data as backup or take only partial information (gyroscopes) from an IMU to support vision-based tracking systems.

To better exploit inertial data, several researchers use an extended Kalman filter to fuse all measurements uniformly to a pose estimate. These systems combine the filter with vision-tracking techniques based on artificial markers, feature points, or lines. Results from these Kalman filter-based systems indicate that using vision measurements effectively reduce the errors accumulated from IMU. However, these systems have not eliminated the problem of long-term drift over large areas inherent in an inertial-based navigation system.

Therefore, there is a need in the art for improved navigation using a method and apparatus for generating three-dimensional pose using multi-modal sensor fusion.

SUMMARY OF THE INVENTION

Embodiments of the present invention comprise a method and apparatus for providing three-dimensional navigation for a node comprising an inertial measurement unit for providing gyroscope, acceleration and velocity information (collectively IMU information); a ranging unit for providing distance information relative to at least one reference node; at least one visual sensor for providing images of an environment surrounding the node; a preprocessor, coupled to the inertial measurement unit, the ranging unit and the plurality of visual sensors, for generating error states for the IMU information, the distance information and the images; and an error-state predictive filter, coupled to the preprocessor, for processing the error states to produce a three-dimensional pose of the node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
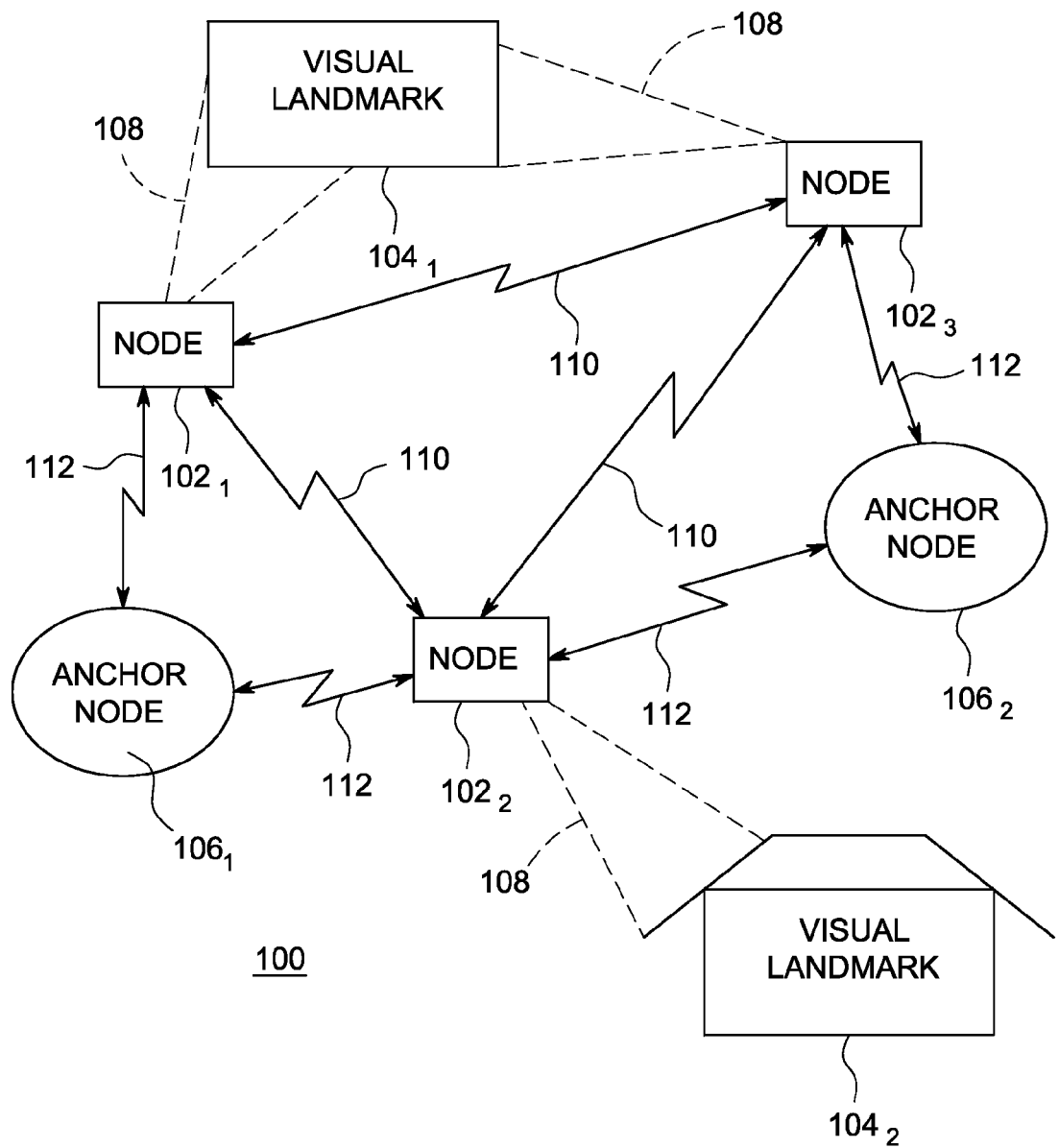
FIG. 1 depicts an environment in which at least one node navigates in accordance with at least one embodiment of the invention.

FIG. 1 depicts an environment 100 in which at least one node (e.g., nodes $102_1$, $102_2$, $102_3$) navigates in accordance with at least one embodiment of the invention. The environment 100 comprises a plurality of mobile nodes (e.g., three mobile nodes $102_1$, $102_2$, $102_3$ are depicted, but any number of mobile nodes may be used), a plurality of visual landmarks (e.g., visual landmarks $104_1$, $104_2$ are depicted, but any number of visual landmarks may be used), and a plurality of anchor nodes (e.g., anchor nodes $106_1$, $106_2$ are depicted, but any number of anchor nodes may be used). Each node 102 computes its three-dimensional pose relative to the global coordinates of the environment 100 through visualization of the landmarks 104 (represented by dashed lines 108), mobile node 102 to reference node ranging (where a reference node may be a mobile node 102 or an anchor node 106), and inertial measurement information generated within each mobile node 102. Communication paths 110 represent ranging from mobile node 102 to mobile node 102, communication paths 112 represent mobile node 102 to anchor node 106 ranging.

Each node 102 fuses vision information with inertial measurement information and ranging information to create a pose estimate for the node that can be used in a navigation system. In one embodiment of the invention, the loss of visual information due to smoke, haze, or other obstruction does not impair a node's ability to navigate. Using the computer within each node 102, the node 102 may generate navigation information for an autonomous or semi-autonomous vehicle (e.g., a robot), generate augmented reality views for a local user, generate augmented reality views for a remote user, provide navigation information for either a remote user or a local user, and the like.

Figure 2:
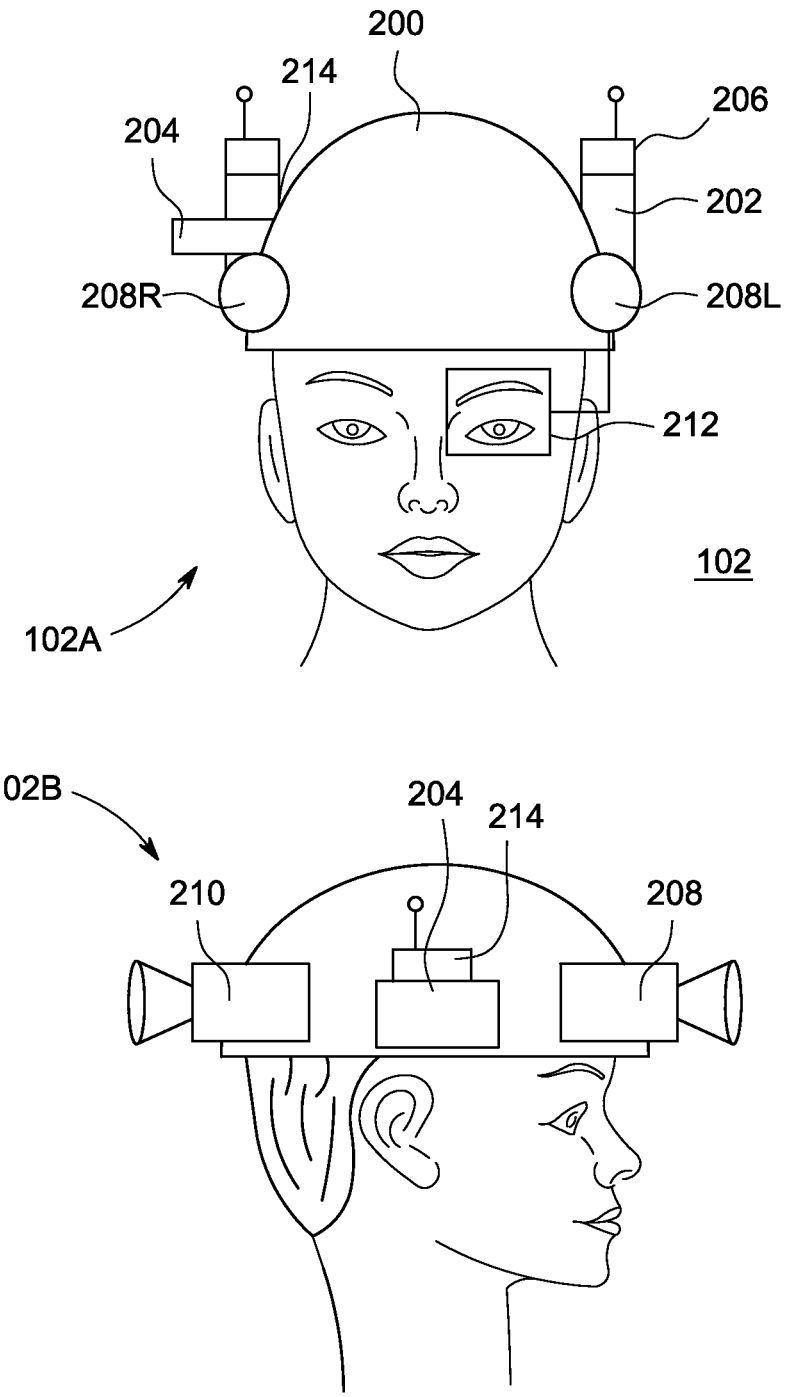
FIG. 2 illustrates a helmet mounted node of FIG. 1 in accordance with at least one embodiment of the invention.

FIG. 2 illustrates one embodiment of a mobile node 102 of FIG. 1 in accordance with at least one embodiment of the invention. The mobile node 102 is depicted in a front view 102A and a side view 102B. The mobile node 102, in this particular embodiment, is mounted to a helmet 200. In other embodiments, the mobile node 102 may be mounted to a vehicle, a robot, a drone, and/or any device/system that utilizes navigation. The mobile node 102 comprises a computer 202, an inertial measurement unit (IMU) 204, at least one ranging unit 206, a front oriented stereo visual sensor 208, a rear oriented stereo visual sensor 210, a head mounted display 212 and a radio transceiver 214. As discussed below, the IMU 204 is physically coupled to the visual sensors to provide gyroscope, velocity and acceleration information regarding the motion of the front and rear visual sensors 208, 210. The mobile node 102 fuses the IMU information with the visual information and ranging information to provide a robust navigation system. Primarily, the mobile node 102 navigates using the IMU information and visual information. When the visual information is obstructed, i.e., an error, ranging information from the at least one ranging unit 206 is used to generate a three-dimensional pose of the node 102.

In one specific embodiment, the ranging unit 206 is a NANOTRON range measuring radio, which uses short (3nS) pulses converted to chirps (frequency sweeps) to enhance noise and multipath immunity. This ranging radio has an outdoor working range of about 150 m with a small size (35 mm×14 mm×3 mm) and low power consumption (about 500 mW). The ranging radio may be helmet mounted with its antenna, or the ranging radio may be carried in a backpack and the ranging radio antenna mounted to the helmet near the visual sensors 208, 210. In other embodiments, the at least one ranging unit may utilize ranging signals such as laser, radiofrequency, ultrasonic and/or the like.

In one embodiment, location information (the location of each node within the environment) may be transmitted amongst the nodes 102 using transceiver 214. In one embodiment, location information (which may include node pose as well as a global coordinate for the node within the environment) is transmitted over a wireless network at a frame rate of, for example, 15 Hz. An open-source data distribution service approach may be used, wherein each node publishes its own location packets as well as subscribes to all the incoming location information sent by the other nodes. Radio packets carrying range data are associated with camera location packets received by each node 102 based on a node identification field in each packet. Thus, in one embodiment, all mobile nodes 102 know the location, pose or both of all other nodes within the environment. The mobile node 102 may locally use the pose to produce navigation/guidance information either to control motion (e.g., steering or flight attitude) or to provide a navigation display to a user. In other embodiments, the mobile node 102 may use the pose to generate augmented reality graphics on a display such as head mounted display 212. Such a display may be generated and shown locally, or the pose may be transmitted to a remote location for display in a navigation or guidance system. Using the mobile node 102 where fog, smoke, or other visual impediment is present, enables a user to navigate using the augmented reality graphics, e.g., graphics representing "real" artifacts, features or obstacles in the environment that cannot presently be visually seen by the user, but can be represented on the display 212. In various embodiments, the display may operate in a video see through mode or an optical see through mode. The video see through mode overlays synthetic characters on a live video of the scene being captured by the visual sensors. The synthetic characters appear as if they are part of the 3D scene and do not jitter or drift in their placement as the visual sensors move. In optical see through mode, the synthetic characters appear on the display 212.

Figure 3:
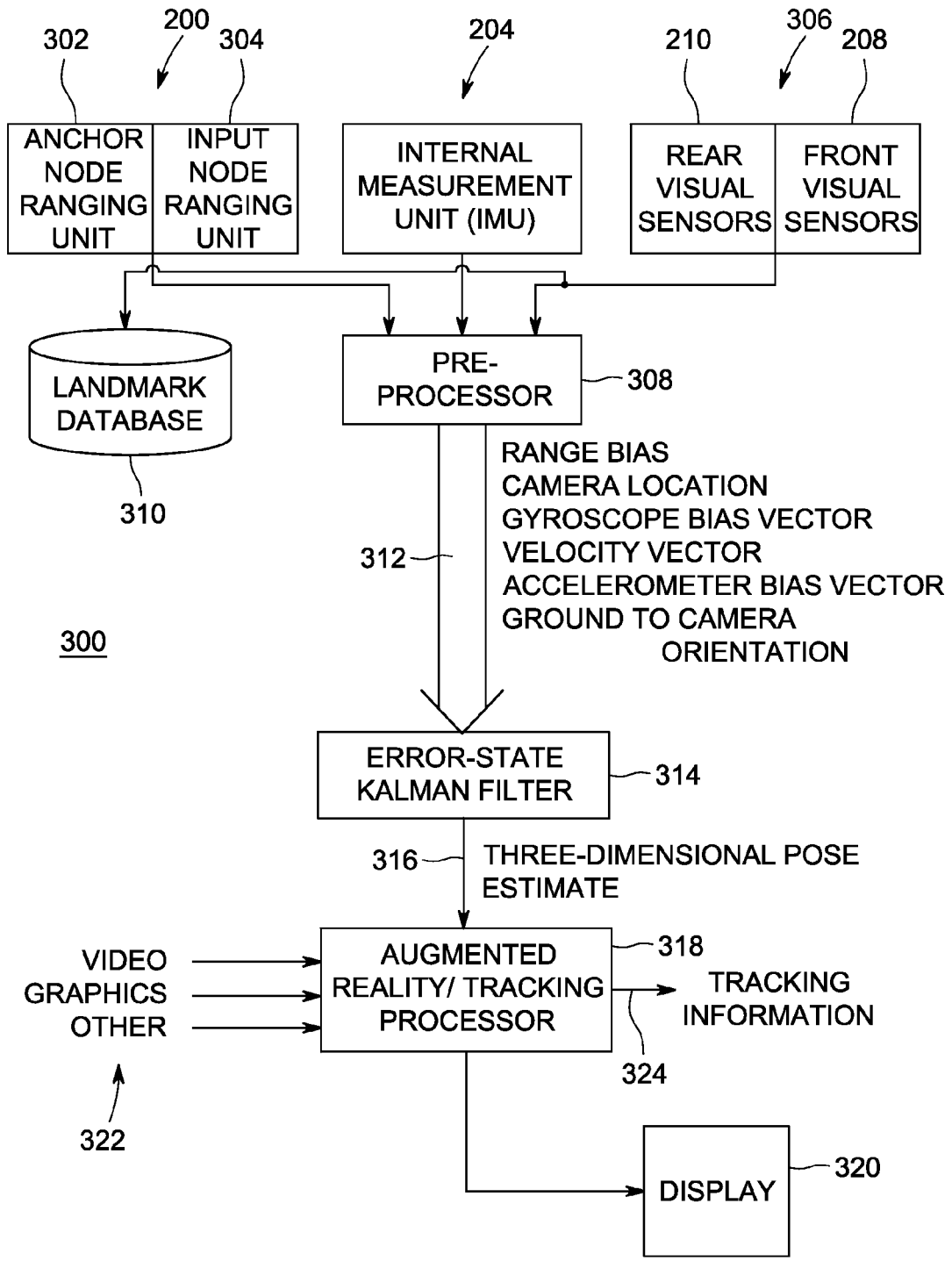
FIG. 3 depicts a functional block diagram of a node of FIG. 1 in accordance with at least one embodiment of the invention.

FIG. 3 depicts a functional block diagram of a node 300 (similar to the node 102 of FIG. 1) in accordance with at least one embodiment of the invention. The node 300 comprises a ranging unit 206, an IMU 204, visual sensors 306, a pre-processor 308, a landmark database 310, an error-state predictive filter 314, an augmented reality/tracking processor 318 and a display 320. Since the ranging unit 206 receives ranging information from both anchor nodes and other mobile nodes, the ranging unit 206 is shown to have two components: an anchor node ranging unit 302 and an inter-node ranging unit 304. In some embodiments, these units 302, 304 are a single ranging radio using signal processing to determine anchor node ranging and inter-node ranging information.

In one embodiment, the IMU 204, as is well known in the art, comprises a gyroscope, a velocity measuring unit and an acceleration measuring unit. In one embodiment, the IMU 204 is a micro-electromechanical (MEMS) device.

In one embodiment, the visual sensors 306 comprise front directed electro-optical stereo sensor 208 and rear directed electro-optical stereo sensor 210. In one embodiment of the invention, stereo sensors are a pair of cameras. The cameras may be infrared, visible or a combination thereof. Any sensor that provides images of the environment may find use as at least one of the visual sensors 306.

The ranging information, the inertial navigation information, and the visual information are coupled to the preprocessor 308. In one embodiment of the invention, the preprocessor 308 utilizes information from a landmark database 310 to reduce the error in an initial node pose computed from the sensor imagery alone. Use of the landmark database 310 is optional. This landmark database 310 is pre-populated with imagery from the environment in which the node 300 operates. The procedure used for populating the landmark database 310 is described with reference to FIG. 5 below. The pre-processor 308 generates a plurality of signals that are utilized by the error-state predictive filter 314 to compute a three-dimensional pose estimate for the node 300. The signals, coupled along path 312, include a range bias, camera location, gyroscope bias vector, velocity vector, accelerometer bias vector, and ground to camera orientation. The procedure used for generating the signals from the measured sensor signals is described in detail with reference to FIG. 6 below.

The error-state predictive filter 314, in one embodiment is an error-stat Kalman filter, uses the signals from the preprocessor 308 to produce a three-dimensional pose estimate that is continuously updated as additional measurements are supplied to the preprocessor 308. The three-dimensional pose estimate is output on path 316.

The error-state predictive filter 314 is used to fuse IMU information, the local measurements from a visual odometry process using front and back facing stereo cameras, ranging information and global measurements from a visual landmark-matching process. The predictive filter 314 adopts a so called "error-state" formulation, so there is no need to specify an explicit dynamic motion model. The filter dynamics follow from the IMU error propagation equations that vary smoothly and therefore are more amenable to linearization. The measurements to the filter consist of the differences between the inertial navigation solution as obtained by solving the IMU mechanization equations and the external source data, which include the relative pose information provided by visual odometry process and global measurements provided by the visual landmark matching process.

In the predictive filter, denote the ground (global coordinate frame) to camera pose as $P_{GC}=[R_{GC}\ T_{GC}]$ such that point $X_G$ expressed in the ground frame can be transferred to the camera coordinates $X_C=R_{GC}X_G+T_{GC}$. Accordingly, $T_{GC}$ represents the ground origin expressed in the camera coordinate frame, whereas $T_{CG}=-R_{GC}^T T_{GC}$ is the camera location in the ground coordinate frame.

In one embodiment, without loss of generality and to keep the notation simple, one embodiment of the filter assumes that the camera and IMU coordinate system coincide so that $P_{GI}=P_{GC}$. In reality, the embodiment uses an extrinsic calibration procedure to determine the camera to IMU pose $P_{CI}$, (front left stereo camera is chosen as the master) and distinguish between $P_{GI}=P_{CI}P_{GC}$ and $P_{GC}$.

The total (full) states of the filter consist of range radio bias $b_r^{(k)}$ for each node $1 \leq k \leq K$, the camera location $T_{CG}$, the gyroscope bias vector $b_g$, velocity vector v in global coordinate frame, accelerometer bias vector $b_a$ and ground to camera orientation $q_{GC}$, expressed in terms of the quaternion representation for rotation such that $R_{GC}=(|qo|^2-||\vec{q}\,||^2)I_{3\times 3}+2\vec{q}\ \vec{q}^T-2qo[\vec{q}]_\times$, with $q_{GC}=[qo\ \vec{q}^T]^T$ and $[\vec{q}]_\times$ denoting the skew-symmetric matrix formed by $\vec{q}$. For quaternion algebra, the embodiment follows the notion and uses a frame rotation perspective. Hence, the total (full) state vector is given by $$s=[q_{GC}^T\ b_g^T\ v^T\ b_a^T\ T_{CG}^T\ b_r^{(1)} \ldots b_r^{(k)}].$$

The embodiment uses the corresponding system model for the state time evolution.

$$\dot{q}_{GC}(t)=1;2(q_{GC}(t)\otimes \omega(t)),\ \dot{b}_g(t)=n_{\omega g}(t)$$

$$\dot{v}(t)=a(t),\ \dot{b}_a(t)=n_{\omega a}(t),\ \dot{T}_{CG}(t)=v(t)$$

$$\dot{b}_r^{(k)}(t)=n_{\omega r}^{(k)}(t),\ 1\leq k\leq K,$$

where $n_{\omega g}$, $n_{\omega a}$, and $n_{\omega r}^{(k)}$ for $1 \leq k \leq K$ are modeled as white Gaussian noise, and a(t) is camera acceleration in global coordinate frame, and ω(t) is the rotational velocity in camera coordinate frame. Gyroscope and accelerometer measurements of these two vectors are modeled as:

$$\dot{q}_{GC}(t)=1;2(q_{GC}(t)\otimes \omega(t)),\ \dot{b}_g(t)=n_{\omega g}(t)$$

$$\dot{v}(t)=a(t),\ \dot{b}_a(t)=n_{\omega a}(t),\ \dot{T}_{CG}(t)=v(t)$$

$$\dot{b}_r^{(k)}(t)=n_{\omega r}^{(k)}(t),\ 1\leq k\leq K,$$

where $n_{\omega g}$, $n_{\omega a}$, and $n_{\omega r}^{(k)}$ for $1 \leq k \leq K$ are modeled as white Gaussian noise, and a(t) is camera acceleration in global coordinate frame, and ω(t) is the rotational velocity in camera coordinate frame. Gyroscope and accelerometer measurements of these two vectors are modeled as:

$$\omega_m(t)=\omega(t)+b_g(t)+n_g(t)$$

$$a_m(t)=R_{GC}(t)(a(t)-g)+b_a(t)+n_a(t)$$

where $n_g$ and $n_a$ are modeled as white Gaussian noise and g is the gravitational acceleration expressed in the global coordinate frame.

State estimate propagation is obtained by the IMU mechanization equations $$\dot{\hat{q}}_{GC}(t)=1;2(\hat{q}_{GC}(t)\otimes \hat{\omega}(t))$$

$$\dot{\hat{v}}(t)=\hat{R}_{GC}^T(t)\hat{a}(t)+g,$$

$$\dot{\hat{x}}(t)=\hat{v}(t),\ \dot{\hat{b}}_g(t)=0,\ \dot{\hat{b}}_a(t)=0$$

where $\hat{\omega}(t)=\omega_m(t)-\hat{b}_g(t)$, and $\hat{a}(t)=\hat{a}_m(t)-\hat{b}_a(t)$, together with the radio bias propagation $$\dot{\hat{b}}_r^{(k)}(t)=0,\ 1\leq k\leq K.$$

The embodiment solves the above system of equations by fourth-order Runge-Kutta numerical integration method. The Kalman filter error state consists of $$\delta s=[\delta\theta^T \delta b_g^T \delta v^T \delta b_a^T \delta T_{CG}^T \delta b_r^{(1)} \ldots \delta b_r^{(K)}]^T$$

according to the following relation between the total state and its inertial estimate $$q_{GC}=\hat{q}_{GC}\otimes \delta q_{GC},\ \text{with}\ \delta q_{GC}\simeq \begin{bmatrix} 1 & \frac{\delta\theta^T}{2} \end{bmatrix}^T$$

$$b_g(t)=\hat{b}_g(t)+\delta b_g(t),\ b_a(t)=\hat{b}_a(t)+\delta b_a(t)$$

$$v(t)=\hat{v}(t)+\delta v(t),\ T_{CG}(t)=\hat{T}_{CG}(t)+\delta T_{CG}(t)$$

together with $$b_r^{(k)}(t)=\hat{b}_r^{(k)}(t)+\delta b_r^{(k)}(t),\ 1\leq k\leq K,$$

based on which the embodiments obtains (after some algebra) the following dynamic process model for the error state:

$$\dot{\delta s}=F\delta s+Gn$$

where $$F=\begin{bmatrix} -[\hat{\omega}]_\times & -I_3 & 0_{3\times 3} & 0_{3\times 3} & 0_{3\times 3} & 0_{3\times K} \\ 0_{3\times 3} & 0_{3\times 3} & 0_{3\times 3} & 0_{3\times 3} & 0_{3\times 3} & 0_{3\times K} \\ -\hat{R}_{GC[\hat{a}]\times}^T & 0_{3\times 3} & 0_{3\times 3} & -\hat{R}_{GC}^T & 0_{3\times 3} & 0_{3\times K} \\ 0_{3\times 3} & 0_{3\times 3} & 0_{3\times 3} & 0_{3\times 3} & 0_{3\times 3} & 0_{3\times K} \\ 0_{3\times 3} & 0_{3\times 3} & I_3 & 0_{3\times 3} & 0_{3\times 3} & 0_{3\times K} \\ 0_{K\times 3} & 0_{K\times 3} & 0_{K\times 3} & 0_{K\times 3} & 0_{K\times 3} & 0_{K\times K} \end{bmatrix}$$

and $$G=\begin{bmatrix} -I_3 & 0_{3\times 3} & 0_{3\times 3} & 0_{3\times 3} & 0_{3\times K} \\ 0_{3\times 3} & I_3 & 0_{3\times 3} & 0_{3\times 3} & 0_{3\times K} \\ 0_{3\times 3} & 0_{3\times 3} & -\hat{R}_{GC}^T & 0_{3\times 3} & 0_{3\times K} \\ 0_{3\times 3} & 0_{3\times 3} & 0_{3\times 3} & I_3 & 0_{3\times K} \\ 0_{3\times 3} & 0_{3\times 3} & 0_{3\times 3} & 0_{3\times 3} & 0_{3\times K} \\ 0_{K\times 3} & 0_{K\times 3} & 0_{K\times 3} & 0_{K\times 3} & I_K \end{bmatrix}$$

and $$n=\begin{bmatrix} n_g^T & n_{\omega g}^T & n_a^T & n_{\omega a}^T & n_{\omega r}^{(1)} & \ldots & n_{\omega r}^{(k)} \end{bmatrix}^T.$$

To incorporate visual odometry poses that are relative in nature, one embodiment of the invention applies a stochastic cloning approach for the measurement model. In particular, the embodiment denotes $P_{1,2}$ as the visual odometry estimate between two time instances 1 and 2, and let the corresponding pose components of the state be denoted by $P_{G,1}$ and $P_{G,2}$. Then defining $T_{2,1}=R_{G,1}(T_{2,G}-T_{1,G})$, and $q_{1,2} = q_{G,1}^{-} q_{G,2}$, and after lengthy algebra, the embodiment obtains the following measurement equations $$\delta z_T = [\hat{R}_{G,1}(\hat{T}_{2,G} - \hat{T}_{1,G})] \times \delta \theta_{G,1} + \hat{R}_{G,1} \delta T_{2,G} - R_{G,1} \delta T_{1,G} + v_T$$

and $$\delta z_q = 1;2\hat{R}_{1,2}{}^T \delta \theta_{G,2} - 1;2\delta \theta_{G,1} + v_q$$

where $v_T$ and $v_q$ are the Gaussian noise in translation and rotation associated with the visual odometry pose solution.

These measurements are a function of the propagated error-state $\delta s_2$ and the cloned error-state $\delta s_1$ from previous time instance, which require modifications to the Kalman filter update equations.

As for landmark matching, given a query image, landmark matching returns the found landmark shot from the database establishing the 2D to 3D point correspondences between the query image features and the 3D local point cloud, as well as the camera pose $P_{GL}$ belonging to that shot. First, every 3D local landmark point X is transferred to the global coordinate system via $$Y = R_{LG} X + T_{LG}$$

which can be written under small error assumption as $$\hat{Y} + \delta Y \simeq (I - [\rho]_x) \hat{R}_{LG} (\hat{X} + \delta X) + \hat{T}_{LG} + \delta T_{LG}$$

where $\rho$ is a small rotation vector. Neglecting second order terms results in the following linearization $$\delta Y \simeq \hat{R}_{LG} \delta X + [\hat{R}_{LG} \hat{X}]_x \rho + \delta T_{LG}$$

and letting $\tilde{X} = \hat{R}_{LG} \hat{X}$, and the local 3D point covariance $\Sigma_y$, can be represented in the global coordinate frame in terms of the local reconstruction uncertainty, $\Sigma_x$ and landmark pose uncertainty in rotation and translation $\Sigma R_{LG}$ and $\Sigma T_{LG}$, as $$\Sigma_Y \simeq \hat{R}_{LG} \Sigma_x \hat{R}_{LG}{}^T + [\tilde{X}]_x \Sigma R_{LG} [\overline{X}]_x{}^T + \Sigma T_{LG}$$

After this transformation, the projective camera measurement model is employed such that for each 3D point Y obtained above and expressed in the current camera coordinate system as $Z = [Z_1 Z_2 Z_3]^T$, the projection onto the normalized image plane is given by $$z = f(Z) + v \text{ with } f(Z) = [Z_1/Z_3 \, Z_2/Z_3]^T$$

where v is the feature measurement noise with covariance $\Sigma_v$, and $$Z = R_{GC} Y + T_{GC} = R_{GC} (Y - T_{CG}).$$

Under small error assumption $$\hat{Z} + \delta Z \simeq (I - [\delta\theta]x) \hat{R}_{GC} (\hat{Y} + \delta Y - \hat{T}_{CG} - \delta T_{CG}).$$

Hence, $$\delta Z \simeq [\hat{R}_{GC} (\hat{Y} - \hat{T}_{CG})]_x \delta\theta + \hat{R}_{GC} (\delta Y - \delta T_{CG}).$$

Accordingly, the measurement equation in the error states is given by $$\delta z_L \simeq H_L \delta s + \eta$$

where the measurement Jacobian $$H_L = J_f [J_\theta 0_{3\times 3} 0_{3\times 3} 0_{3\times 3} J_{\delta TCG}]$$

with $$J_f = \begin{bmatrix} 1/\hat{Z}_3 & 0 & -\hat{Z}_1/\hat{Z}_3^2 \\ 0 & 1/\hat{Z}_3 & -\hat{Z}_2/\hat{Z}_3^2 \end{bmatrix}$$

$$J\theta = [\hat{R}_{GC}(\hat{Y} - \hat{T}_{CG})]_x, \text{ and } J_{\delta TCG} = \hat{R}_{GC}$$

and $$\Sigma \eta = J_f [\hat{R}_{GC} \Sigma_Y \hat{R}_{GC}{}^T] J_f{}^T + \Sigma_v.$$

The above is applied to all the point correspondences returned as a result of landmark matching, and all the matrices and vectors are stacked to form the final measurement model equation.

Each radio node provides a measurement of its range to every other node in the system, which is modeled as $$z_r^{(k)} = \|T_{CG} - T_{RG}^{(k)}\| + b_r^{(k)} + v_r^{(k)}, \, 1 \leq k \leq K$$

Where $v_r^{(k)}$ is white Gaussian measurement noise and the embodiment denotes by $T_{RG}^{(k)}$, the location in global coordinates of that particular node that is being ranged to, whose location is known by the radio that is doing the ranging. (Note that, coordinates of the static nodes are stored in each unit and remain fixed, whereas the location of mobile nodes are given by $T_{CG}^{(k)}$ and are continuously broadcast at the frame rate over the wireless network.) Using the small error assumption, the above can be written as $$\hat{z}_r^{(k)} + \delta z_r^{(k)} \simeq \|\hat{T}_{CG} - T_{RG}^{(k)}\| + J_r \delta T_{CG} + \hat{b}_r^{(k)} + \delta b^{(k)} + v_r^{(k)}$$

where $$J_r = \frac{\hat{T}_{CG}^T - T_{RG}^{(k)T}}{\|\hat{T}_{CG} - T_{RG}^{(k)}\|}$$

so that $$\delta z_r^{(k)} \simeq J_r \delta T_{CG} + \delta b^{(k)} + v_r^{(k)}$$

from which results $$\delta z_r^{(k)} = H_r \delta s + v_r^{(k)}$$

with $$H_r = [0_{1\times 3} \, 0_{1\times 3} \, 0_{1\times 3} \, 0_{1\times 3} \, J_r, e_{1\times K}^{(k)}],$$

where $e_{1\times K}^{(k)}$ is a 1×K vector of zeros whose k'th element is a 1.

In the predictive filter, denote the ground (global coordinate frame) to camera pose as $P_{GC} = [R_{GC} T_{GC}]$ such that point $X_G$ expressed in the ground frame can be transferred to the camera coordinates $X_C = R_{GC} X_G + T_{GC}$. Accordingly, $T_{GC}$ represents the ground origin expressed in the camera coordinate frame, whereas $T_{CG} = -R_{GC}{}^T T_{GC}$ is the camera location in the ground coordinate frame.

In one embodiment, without loss of generality and to keep the notation simple, one embodiment of the filter assumes that the camera and IMU coordinate system coincide so that $P_{GI} = P_{GC}$. In reality, the embodiment uses an extrinsic calibration procedure to determine the camera to IMU pose $P_{CI}$, (front left stereo camera is chosen as the master) and distinguish between $P_{GI} = P_{CI} P_{GC}$ and $P_{GC}$.

The total (full) states of the filter consist of range radio bias $b_r^{(k)}$ for each node $1 \leq k \leq K$, the camera location $T_{CG}$, the gyroscope bias vector $b_g$, velocity vector v in global coordinate frame, accelerometer bias vector $b_a$ and ground to camera orientation $q_{GC}$, expressed in terms of the quaternion representation for rotation such that $R_{GC} = (|qo|^2 - \|\vec{q}\|^2)I_{3\times 3} + 2\vec{q}\,\vec{q}^T - 2qo[\vec{q}]_x$, with $q_{GC} = [qo \, \vec{q}^T]^T$ and $[\vec{q}]_x$ denoting the skew-symmetric matrix formed by $\vec{q}$. For quaternion algebra, the embodiment follows the notion and uses a frame rotation perspective. Hence, the total (full) state vector is given by $$s = [q_{GC}{}^T b_g{}^T v^T b_a{}^T T_{CG}{}^T b_r^{(1)} \ldots b_r^{(k)}].$$

The embodiment uses the corresponding system model for the state time evolution.

$$\dot{q}_{GC}(t) = 1;2(q_{GC}(t) \otimes \omega(t)), b_g(t) = n_{\omega g}(t)$$

$$\dot{v}(t) = a(t), \dot{b}_a(t) = n_{\omega a}(t), \dot{T}_{CG}(t) = v(t)$$

$$\dot{b}_r^{(k)}(t) = n_{\omega r}^{(k)}(t), 1 \le k \le K,$$

where $n_{\omega g}$, $n_{\omega a}$, and $n_{\omega r}^{(k)}$ for $1 \le k \le K$ are modeled as white Gaussian noise, and $a(t)$ is camera acceleration in global coordinate frame, and $\omega(t)$ is the rotational velocity in camera coordinate frame. Gyroscope and accelerometer measurements of these two vectors are modeled as:

$$\dot{q}_{GC}(t) = 1;2(q_{GC}(t) \otimes \omega(t)), b_g(t) = n_{\omega g}(t)$$

$$\dot{v}(t) = a(t), \dot{b}_a(t) = n_{\omega a}(t), \dot{T}_{CG}(t) = v(t)$$

$$\dot{b}_r^{(k)}(t) = n_{\omega r}^{(k)}(t), 1 \le k \le K,$$

where $n_{\omega g}$, $n_{\omega a}$, and $n_{\omega r}^{(k)}$ for $1 \le k \le K$ are modeled as white Gaussian noise, and $a(t)$ is camera acceleration in global coordinate frame, and $\omega(t)$ is the rotational velocity in camera coordinate frame. Gyroscope and accelerometer measurements of these two vectors are modeled as:

$$\omega_m(t) = \omega(t) + b_g(t) + n_g(t)$$

$$a_m(t) = R_{GC}(t)(a(t) - g) + b_a(t) + n_a(t)$$

where $n_g$ and $n_a$ are modeled as white Gaussian noise and g is the gravitational acceleration expressed in the global coordinate frame.

State estimate propagation is obtained by the IMU mechanization equations $$\dot{\hat{q}}_{GC}(t) = 1;2(\hat{q}_{GC}(t) \otimes \hat{\omega}(t))$$

$$\dot{\hat{v}}(t) = \hat{R}_{GC}^T(t)\hat{a}(t) + g,$$

$$\dot{\hat{x}}(t) = \hat{v}(t), \dot{\hat{b}}_g(t) = 0, \dot{\hat{b}}_a(t) = 0$$

where $\hat{\omega}(t) = \omega_m(t) - \hat{b}_g(t)$, and $\hat{a}(t) = \hat{a}_m(t) - \hat{b}_a(t)$, together with the radio bias propagation $$\dot{\hat{b}}_r^{(k)}(t) = 0, 1 \le k \le K.$$

The embodiment solves the above system of equations by fourth-order Runge-Kutta numerical integration method. The Kalman filter error state consists of $$\delta s = [\delta \theta^T \delta b_g^T \delta v^T \delta b_a^T \delta T_{CG}^T \delta b_r^{(1)} \ldots \delta b_r^{(K)}]^T$$

according to the following relation between the total state and its inertial estimate $$q_{GC} = \hat{q}_{GC} \otimes \delta q_{GC}, \text{ with } \delta q_{GC} \approx \begin{bmatrix} 1 \frac{\delta_\theta^T}{2} \end{bmatrix}^T$$

$$b_g(t) = \hat{b}_g(t) + \delta b_g(t), b_a(t) = \hat{b}_a(t) + \delta b_a(t)$$

$$v(t) = \hat{v}(t) + \delta v(t), T_{CG}(t) = \hat{T}_{CG}(t) + \delta T_{CG}(t)$$

together with $$b_r^{(k)}(t) = \hat{b}_r^{(k)}(t) + \delta b_r^{(k)}(t), 1 \le k \le K,$$

based on which the embodiments obtains (after some algebra) the following dynamic process model for the error state:

$$\dot{\delta s} = F \delta s + Gn$$

where $$F = \begin{bmatrix} -[\hat{\omega}]_x & -I_3 & 0_{3\times3} & 0_{3\times3} & 0_{3\times3} & 0_{3\times K} \\ 0_{3\times3} & 0_{3\times3} & 0_{3\times3} & 0_{3\times3} & 0_{3\times3} & 0_{3\times K} \\ -\hat{R}_{GC}^T[\hat{a}]_x & 0_{3\times3} & 0_{3\times3} & -\hat{R}_{GC}^T & 0_{3\times3} & 0_{3\times K} \\ 0_{3\times3} & 0_{3\times3} & 0_{3\times3} & 0_{3\times3} & 0_{3\times3} & 0_{3\times K} \\ 0_{3\times3} & 0_{3\times3} & I_3 & 0_{3\times3} & 0_{3\times3} & 0_{3\times K} \\ 0_{K\times3} & 0_{K\times3} & 0_{K\times3} & 0_{K\times3} & 0_{K\times3} & 0_{K\times K} \end{bmatrix}$$

and $$G = \begin{bmatrix} -I_3 & 0_{3\times3} & 0_{3\times3} & 0_{3\times3} & 0_{3\times K} \\ 0_{3\times3} & I_3 & 0_{3\times3} & 0_{3\times3} & 0_{3\times K} \\ 0_{3\times3} & 0_{3\times3} & -\hat{R}_{GC}^T & 0_{3\times3} & 0_{3\times K} \\ 0_{3\times3} & 0_{3\times3} & 0_{3\times3} & I_3 & 0_{3\times K} \\ 0_{3\times3} & 0_{3\times3} & 0_{3\times3} & 0_{3\times3} & 0_{3\times K} \\ 0_{K\times3} & 0_{K\times3} & 0_{K\times3} & 0_{K\times3} & I_K \end{bmatrix}$$

and $n = [n_g^T \; n_{\omega g}^T \; n_a^T \; n_{\omega a}^T \; n_{\omega r}^{(1)} \ldots n_{\omega r}^{(k)}]^T$.

To incorporate visual odometry poses that are relative in nature, one embodiment of the invention applies a stochastic cloning approach for the measurement model. In particular, the embodiment denotes $P_{1,2}$ as the visual odometry pose estimate between two time instances 1 and 2, and let the corresponding pose components of the state be denoted by $P_{G,1}$ and $P_{G,2}$. Then defining $T_{2,1} = R_{G,1}(T_{2,G} - T_{1,G})$, and $q_{1,2} = q_{G,1}^{-} q_{G,2}$, and after lengthy algebra, the embodiment obtains the following measurement equations $$\delta z_T = [\hat{R}_{G,1}(\hat{T}_{2,G} - \hat{T}_{1,G})] \times \delta \theta_{G,1} + \hat{R}_{G,1} \delta T_{2,G} - R_{G,1} \delta T_{1,G} + v_T$$

and $$\delta z_q = 1;2\hat{R}_{1,2}^T \delta \theta_{G,2} - 1;2 \delta \theta_{G,1} + v_q$$

where $v_T$ and $v_q$ are the Gaussian noise in translation and rotation associated with the visual odometry pose solution.

These measurements are a function of the propagated error-state $\delta s_2$ and the cloned error-state $\delta s_1$ from previous time instance, which require modifications to the Kalman filter update equations.

As for landmark matching, given a query image, landmark matching returns the found landmark shot from the database establishing the 2D to 3D point correspondences between the query image features and the 3D local point cloud, as well as the camera pose $P_{GL}$ belonging to that shot. First, every 3D local landmark point X is transferred to the global coordinate system via $$Y = R_{LG}X + T_{LG}$$

which can be written under small error assumption as $$\hat{Y} + \delta Y \approx (I - [\rho]_x)\hat{R}_{LG}(\hat{X} + \delta X) + \hat{T}_{LG} + \delta T_{LG}$$

where $\rho$ is a small rotation vector. Neglecting second order terms results in the following linearization $$\delta Y = \hat{R}_{LG}\delta X + [\hat{R}_{LG}\hat{X}]_x \rho + \delta T_{LG}$$

and letting $\tilde{X} = \hat{R}_{LG}\hat{X}$, and the local 3D point covariance $\Sigma_y$, can be represented in the global coordinate frame in terms of the local reconstruction uncertainty, $\Sigma_x$ and landmark pose uncertainty in rotation and translation $\Sigma R_{LG}$ and $\Sigma T_{LG}$, as $$\Sigma_Y = \hat{R}_{LG}\Sigma_x \hat{R}_{LG}^T + [\tilde{X}]_x \Sigma R_{LG}[\tilde{X}]_x^T + \Sigma T_{LG}$$

After this transformation, the projective camera measurement model is employed such that for each 3D point Y obtained above and expressed in the current camera coordinate system as $Z=[Z_1 Z_2 Z_3]^T$, the projection onto the normalized image plane is given by $$z = f(Z) + v \text{ with } f(Z) = [Z_1/Z_3 \; Z_2/Z_3]^T$$

where v is the feature measurement noise with covariance $\Sigma_v$ and $$Z = R_{GC} Y + T_{GC} = R_{GC}(Y - T_{CG}).$$

Under small error assumption $$\hat{Z} + \delta Z \approx (I - [\delta\theta]x)\hat{R}_{GC}(\hat{Y} + \delta Y - \hat{T}_{CG} - \delta T_{CG}).$$

Hence, $$\delta Z \approx [\hat{R}_{GC}(\hat{Y} - \hat{T}_{CG})]_x \delta\theta + \hat{R}_{GC}(\delta Y - \delta T_{CG}).$$

Accordingly, the measurement equation in the error states is given by $$\delta z_L \approx H_L \delta s + \eta$$

where the measurement Jacobian $$H_L = J_f[J_\theta \; 0_{3\times3} \; 0_{3\times3} \; 0_{3\times3} \; J_{\delta TCG}]$$

with $$J_f = \begin{bmatrix} 1/\hat{Z}_3 & 0 & -\hat{Z}_1/\hat{Z}_3^2 \\ 0 & 1/\hat{Z}_3 & -\hat{Z}_2/\hat{Z}_3^2 \end{bmatrix}$$

$$J_\theta = [\hat{R}_{GC}(\hat{Y} - \hat{T}_{CG})]_x, \text{ and } J_{\delta TCG} = \hat{R}_{GC}$$

and $$\Sigma_\eta = J_f[\hat{R}_{GC}\Sigma_Y \hat{R}_{GC}^T]J_f^T + \Sigma_v.$$

The above is applied to all the point correspondences returned as a result of landmark matching, and all the matrices and vectors are stacked to form the final measurement model equation.

Each radio node provides a measurement of its range to every other node in the system, which is modeled as $$z_r^{(k)} = \|T_{CG} - T_{RG}^{(k)}\| + b_r^{(k)} + v_r^{(k)}, \; 1 \leq k \leq K$$

Where $v_r^{(k)}$ is white Gaussian measurement noise and the embodiment denotes by $T_{RG}^{(k)}$, the location in global coordinates of that particular node that is being ranged to, whose location is known by the radio that is doing the ranging. (Note that, coordinates of the static nodes are stored in each unit and remain fixed, whereas the location of mobile nodes are given by $T_{CG}^{(k)}$ and are continuously broadcast at the frame rate over the wireless network.) Using the small error assumption, the above can be written as $$\hat{z}_r^{(k)} + \delta z_r^{(k)} \approx \|\hat{T}_{CG} - T_{RG}^{(k)}\| + J_r \delta T_{CG} + \hat{b}_r^{(k)} + \delta b_r^{(k)} + v_r^{(k)}$$

where $$J_r = \frac{\hat{T}_{CG}^T - T_{RG}^{(k)T}}{\|\hat{T}_{CG} - T_{RG}^{(k)}\|}$$

so that $$\delta z_r^{(k)} \approx J_r \delta T_{CG} + \delta b^{(k)} + v_r^{(k)}$$

from which results $$\delta z_r^{(k)} = H_r \delta s + v_r^{(k)}$$

with $$H_r = [0_{1\times3} \; 0_{1\times3} \; 0_{1\times3} \; 0_{1\times3} \; J_r, e_{1\times K}^{(k)}],$$

where $e_{1\times K}^{(k)}$ is a 1×K vector of zeros whose k'th element is a 1.

The augmented reality/tracking processor 318 (generally referred to herein as an output processor) utilizes the three-dimensional pose estimate on path 316 to generate tracking information on path 324 and/or an augmented reality display 320. This processor 318 may form a portion of the node 300 as shown in FIG. 3, or the processor 318 may be remotely located. When remotely located, the three-dimensional pose estimate may be transmitted to the remote location using the node's transceiver (e.g., transceiver 204 in FIG. 2). The tracking information 324 may be used for understanding the position of the node 300 from a remote location, used to provide navigation information to the node 300, used locally by the node for node guidance, and the like. In other embodiments, the processor 318 may utilize externally provided video, graphics and other information at ports 322 to generate the augmented reality display 320. Techniques for creating such augmented reality displays are well-known to those skilled in the art.

Figure 4:
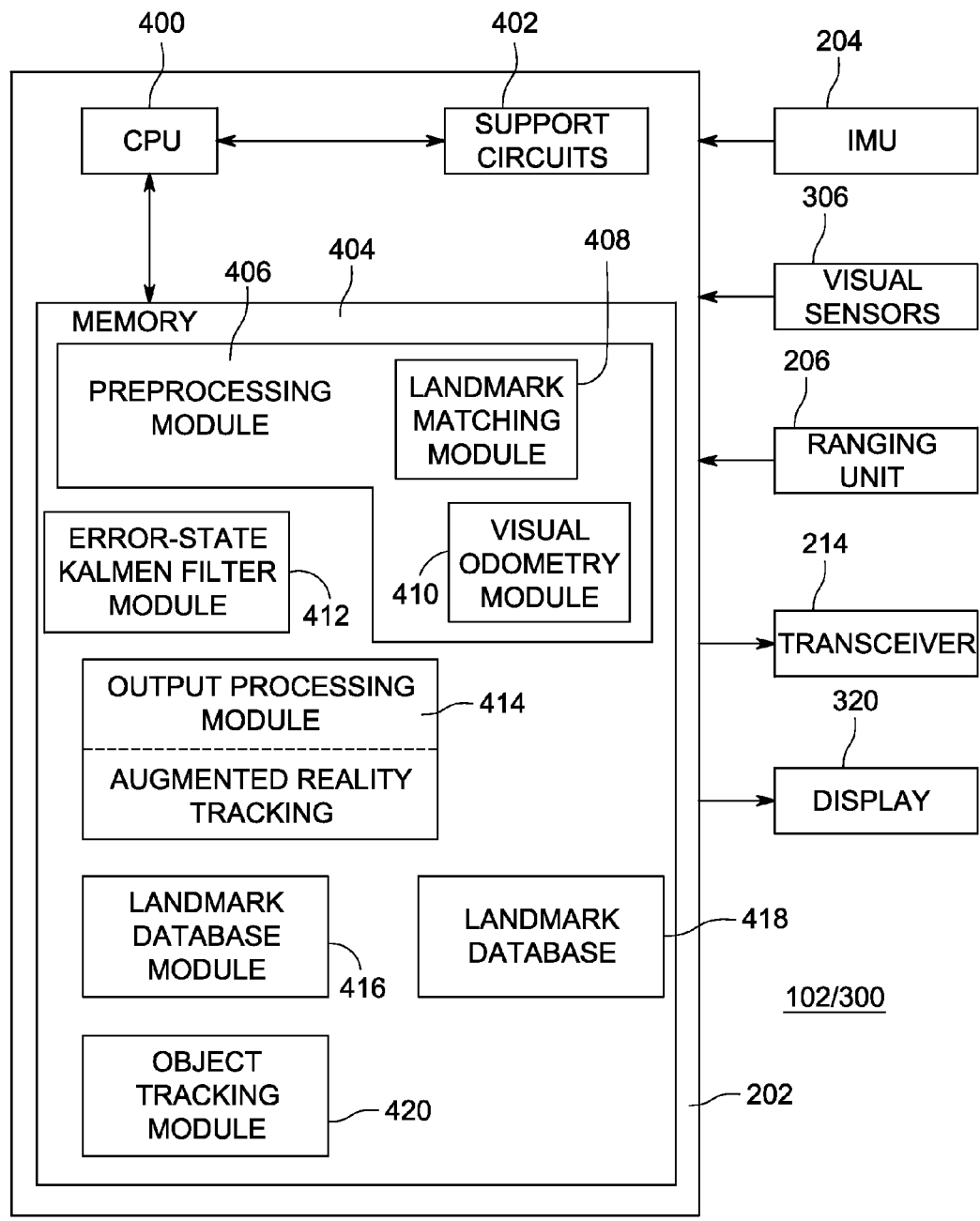
FIG. 4 depicts a computer apparatus for implementing a portion of at least one embodiment of a node of FIG. 1.

FIG. 4 depicts a computer 202 forming a portion of at least one embodiment of a node 102/300 of FIGS. 1 and 3. The computer 202 receives input from the IMU 204, visual sensors 306 and ranging unit 206. The output information from the computer 202 is coupled to either a transceiver 214 for transmission to a remote location for further processing or, when using the output information locally, a display 320 or to other local processes to provide node guidance or navigation.

The computer 202 comprises a central processing unit (CPU) 400, support circuits 402 and memory 404. The CPU 400 comprises one or more commercially available processors, microprocessors, microcontrollers and the like, which are capable of performing the processing described herein. The support circuits 402 comprise well-known circuits used to support functionality of the CPU 400. Such circuits include power supplies, cache, timing circuits, communications buses, input/output circuitry, and the like.

The memory 404 stores a plurality of software modules that when executed by the CPU 400 cause the computer 202 to operate as a specific purpose computer. The memory 404 comprises a preprocessing module 406, an error state predictive filter module 412, and an output processing module 414, a landmark database module 416, and a landmark database 418. The preprocessing module 406 comprises a landmark matching module 408 and a visual odometry module 410. Operation of the preprocessing module 406 is described with respect to FIG. 6 below. The error-state predictive filter module 412 is described above with respect to FIG. 3. The output processing module 414 provides the functionality of the augmented reality/tracking processor described with respect to FIG. 3. The landmark database module 416 and its associated landmark database 418 are described with respect to FIG. 5 below.

In one embodiment, the memory 404 stores an object tracking module 420 that, when executed, enables a node to track on object within the environment, One exemplary object is a weapon. The module 420 tracks markers on the weapon such that the pose of the weapon can be monitored. Details of the operation of the object tracking module 420 are described with reference to FIGS. 7, 8 and 9 below.

Figure 5:
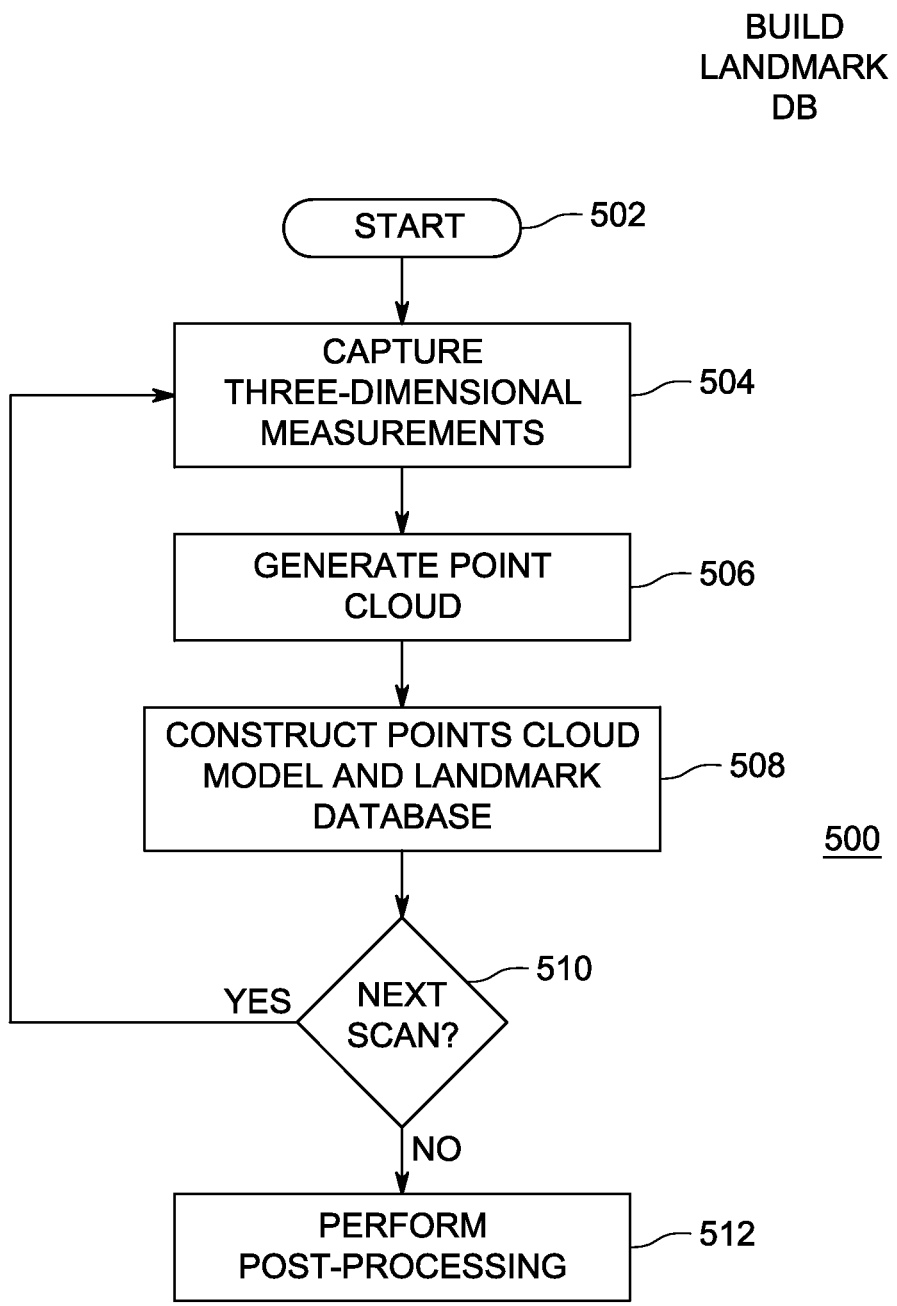
FIG. 5 depicts a flow diagram of a method for building a landmark database used in the navigation process of at least one embodiment of a node of FIG. 1.

FIG. 5 depicts a flow diagram of a method 500 for building a landmark database (e.g., database 418 of FIG. 4) used in the node pose computation of at least one embodiment of a node 102/300s of FIGS. 1 and 3. This method may be a portion of the landmark database module 416 and executed by the node's computer. Alternatively, the method 500 may be executed using a separate robot to "map" the environment prior to operating a node in the environment.

The method 500 begins at step 502 and proceeds to step 504, where the method 500 captures three-dimensional measurements of the environment within which a node will operate. In one embodiment, the three-dimensional measurements are produced using a LIDAR scanner. Other forms of scanners such as radar, ultrasonic, laser and the like may also be used.

At step 506, the method 500 utilizes the three-dimensional measurements to generate a point cloud representation of the environment. Because the three dimensional measurements from a LIDAR sensor have a linear error with respect to range, overlapping point clouds can be aligned with a high degree of accuracy. This provides the correction necessary to eliminate drift that would otherwise exist in the collected landmark database.

As the scanner traverses the environment (autonomously or user-controlled), it stops at regular intervals and pans, recording full omni-directional visual and 3D data at each position. Each of these local data collections is called a 360° scan. The algorithm for automatic point cloud integration and pose correction is set up as a pipeline that processes each 360° scan in turn. A single 360° scan $S_i$ includes LIDAR and camera data from time $t_i$ to $t_j$. The LIDAR data consists of a set of scanlines $L[t_i \ldots t_j]$, the camera data consists of a set of images $I[t_i \ldots t_j]$, and the visual odometry outputs a corresponding set of poses (one for each image) $P[t_i \ldots t_j]$. There is a point cloud database $DB_{3D}$ and a landmark database $DB_{LM}$. Iterative closest point (ICP) is an EM-style of algorithm used to align two overlapping point clouds. The algorithm for constructing the model and landmark database follows:

for each scan S
  integrate $L[t_i \ldots t_j]$ using $P[t_i \ldots t_j]$ to get $X_i$
  query $DB_{3D}$ for overlapping scans $X_{DB}$
  align $X_i$ with $X_{DB}$ using ICP algorithm
  transform $X_i$ with ICP correction:
  $X_i' = P_{ICP} X_i$
  add $X_i'$ to $DB_{3D}$
  transform $P[t_i \ldots t_j]$ with same ICP correction
  $P'[t_i \ldots t_j] = P_{ICP} P[t_i \ldots t_j]$
  add $(P'[t_i \ldots t_j], I[t_i \ldots t_j])$ to $DB_{LM}$
end At step 508 the method 500 constructs a point cloud model and a landmark database. The landmark database comprises positioning information of particular landmarks (e.g., physical structures) within a global coordinate system of the environment. For each landmark, the database stores three elements: a three-dimensional coordinate vector representing the landmark's three-dimensional location within the environment, a two-dimensional coordinate vector representing the landmark's two-dimensional location in an image, and a feature descriptor the characterizes the landmark's appearance.

At step 510, the method 500 queries whether a next scan is to be performed to continue expanding the point cloud model and the landmark database. If the query is affirmatively answered, the method 500 proceeds to step 504. If the query is negatively answered, the method 500 proceeds to step 512 to perform post-processing. Once all scans have been processed and the two databases have been populated with landmarks and point clouds, post-processing may be performed to apply global transformations, remove redundant data, or subsample the point clouds to a uniform density.

Figure 6:
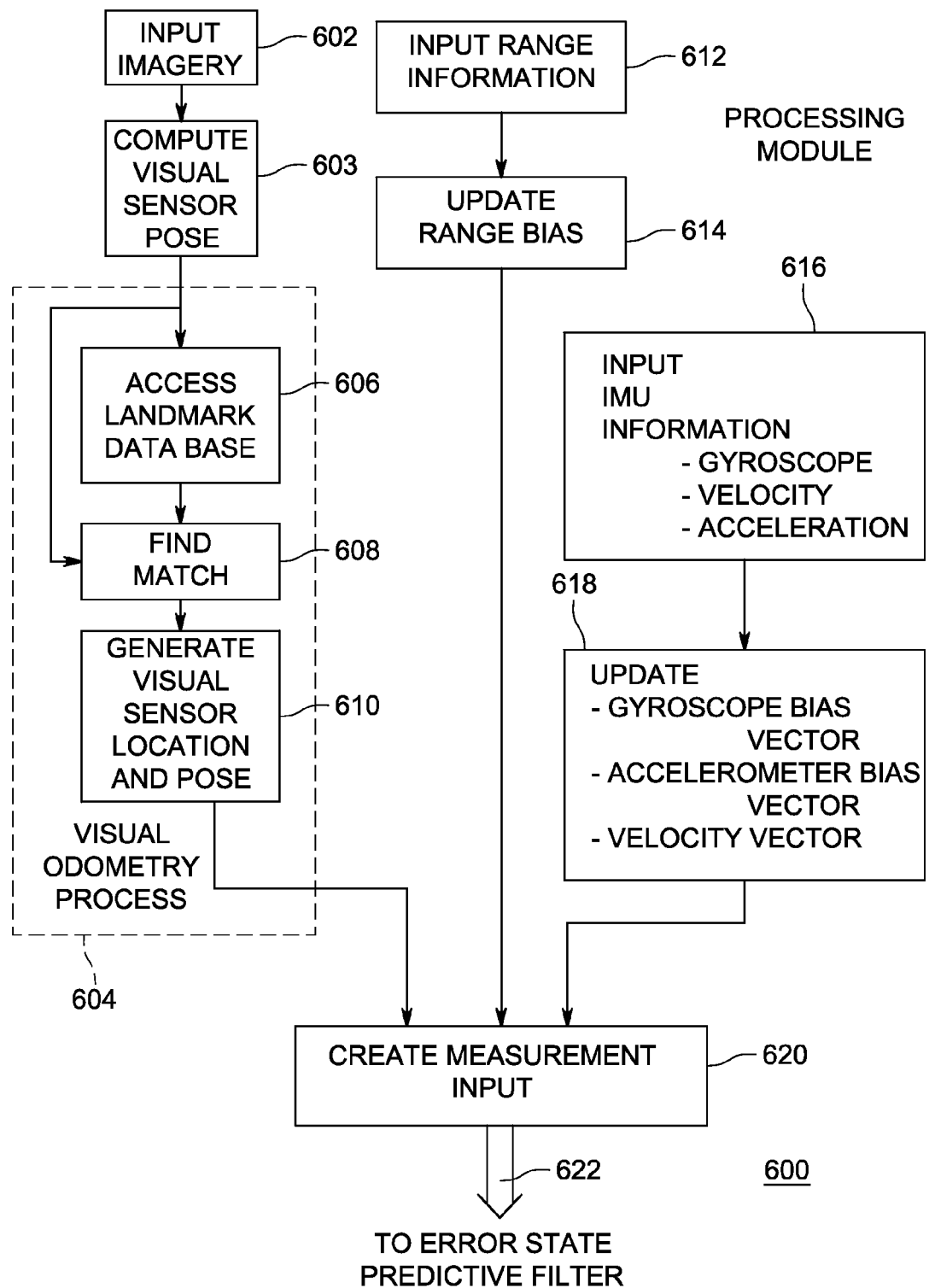
FIG. 6 depicts a flow diagram of a method of operation of a preprocessing module executed by the computer apparatus of FIG. 4.

FIG. 6 depicts a flow diagram of a method 600 of operation of the preprocessing module 406 executed by the computer of FIG. 4 in accordance with one embodiment of the invention.

The method 600 receives input imagery at step 602, input range information at step 612, and input IMU information at step 616.

Input imagery is applied to a visual odometry process 604 wherein the imagery is used to generate visual sensor location information. Visual odometry addresses the problem of estimating camera poses based on image sequences in a relative coordinate system. At step 603, the poses of video frames are computed in the coordinate system of the first frame or a key frame in the sequence.

In one embodiment, video frames captured from the multi-camera system are used to compute the visual odometry solution. After acquiring the left and right camera image frames at time $t_k$, the first step consists of detecting and matching Harris corner based feature points in each stereo pair. Feature point image coordinates are normalized using the known intrinsic calibration parameters in each camera (by multiplication with the inverse of a calibration matrix) and compensated for radial distortion. In the stereo matching process, calibration information allows the method 500 to eliminate most of the false matches by applying epipolar and disparity constraints. The stereo camera calibration process is a standard process in computer vision. The method is based on tracking image features on a known calibration board from both the left and right cameras simultaneously. Using the positions of the tracked image features and the corresponding 3D positions of those features on the calibration board, the relative orientation of each of the cameras with respect to the calibration board is computed. From this step, the relative orientation of the two cameras with respect to each other is computed and stored as the extrinsic calibration parameters. The same process is also used to compute intrinsic camera parameters such as focal len., image center, radial distortion etc.

Calibration is followed by computation of the 3D locations corresponding to these feature points through stereo triangulation in the coordinate frame of the current left camera. Next, using the new image frames at time step $t_{k+1}$, 2D-2D correspondences are established by matching feature points between the previous frames at time step $t_k$ and the current ones at $t_{k+1}$. This allows 3D-2D point correspondences to be established based on the 3D point cloud computed in the previous step. Finally, the pose of the left camera in each stereo pair can be computed using a robust resection method based on RANSAC followed by iterative refinement of the winning hypothesis where Cauchy-based robust cost function of the reprojection errors in both the left and right images is minimized. For the front stereo pair (j=1) and back stereo pair (j=2), this cost function is given by:

$$c_j(P_k^j) = \sum_{i=1}^{K_j} \rho\left(x_i^{l,j} - h(P_k^j X_i^j)\right) + \rho\left(x_i^{r,j} - h(P^{s,j} P_k^j X_i^j)\right)$$

where, for the $j^{th}$ stereo pair, $K_j$ is the number of feature points, $x_i^l$ and $x_i^r$ denote coordinates of the feature point i in the left and right images, $X_i^j$ denotes its 3D position in homogeneous coordinates, $P^s$ denotes the pose of the right camera in the left camera coordinate frame (known through stereo calibration), function h is used in denoting the conversion from homogeneous to inhomogeneous coordinates, $\rho(y) = \log(1+\|y\|^2/a^2)$ is the Cauchy-based robust cost function with a given scale parameter a, and finally $P_k^j = P_j(t_{k,\ tk+1})$ is the relative pose across two time instants.

Calibration is followed by computation of the 3D locations corresponding to these feature points through stereo triangulation in the coordinate frame of the current left camera. Next, using the new image frames at time step $t_{k+1}$, 2D-2D correspondences are established by matching feature points between the previous frames at time step $t_k$ and the current ones at $t_{k+1}$. This allows 3D-2D point correspondences to be established based on the 3D point cloud computed in the previous step. Finally, the pose of the left camera in each stereo pair can be computed using a robust resection method based on RANSAC followed by iterative refinement of the winning hypothesis where Cauchy-based robust cost function of the reprojection errors in both the left and right images is minimized. For the front stereo pair (j=1) and back stereo pair (j=2), this cost function is given by:

$$c_j(P_k^j) = \sum_{i=1}^{K_j} \rho\left(x_i^{l,j} - h(P_k^j X_i^j)\right) + \rho\left(x_i^{r,j} - h(P^{sj} P_k^j X_i^j)\right)$$

where, for the $j^{th}$ stereo pair, $K_j$ is the number of feature points, $x_i^l$ and $x_i^r$ denote coordinates of the feature point i in the left and right images, $X_i^j$ denotes its 3D position in homogeneous coordinates, $P^s$ denotes the pose of the right camera in the left camera coordinate frame (known through stereo calibration), function h is used in denoting the conversion from homogeneous to inhomogeneous coordinates, $\rho(y) = \log(1+\|y\|^2/a^2)$ is the Cauchy-based robust cost function with a given scale parameter a, and finally $P_k^j = P_j(t_{k, tk+1})$ is the relative pose across two time instants.

The method 600 performs the above steps independently for both the front and back stereo pairs in a parallel fashion. At the end of this process, two pose estimates are obtained from both pairs and the best one is chosen based on a cumulative (global) score.

Landmark matching of the sensor videos to a landmark database allows the visual odometry process 604 to locate and track the node's 3D position and pose in an absolute world coordinate system. An incremental motion based navigation system fusing visual odometry, and IMU via Kalman filter is only locally accurate and will drift eventually as the errors accumulate. This drift is mitigated when using either landmark processing or ranging to augment the visual odometry solution. Landmark-based navigation locates the node in an absolute coordinate system and prevents drift. By integrating two complementary modules (visual odometry and landmark matching), the two-stage localization technique dramatically increases the robustness of the combined system.

In one embodiment, a landmark is defined as a feature point in a scene. Specifically, it is extracted from the image using a Harris corner detector. Each landmark is associated with three elements: a 3D coordinate vector representing the 3D location, a 2D coordinate vector representing the 2D location in the image and a feature descriptor that characterizes the appearance. The histogram of oriented gradients (HOG) descriptor is used to model the appearance of each of the selected corner points.

Method 600 accesses the landmark database at step 606. The landmark database is represented as a collection of landmark shots, where a landmark shot is a set of landmarks captured at a specific camera location and view point (or camera pose). A landmark shot is the basic unit of landmark matching. For each landmark shot, besides storing all the location (2D+3D) and appearance (HOG) information of each landmark into the database, the associated camera pose at that instant is also stored.

When the node initializes, it locates itself by searching the entire landmark database. This is performed via the fast indexing technique using a vocabulary tree. Once the node locates itself globally, it will update the current camera pose and its uncertainty to estimate a search region. The estimated search region will serve as a geo-spatial constraint to select a smaller set of landmarks for matching in the next frame. As a result, both efficiency and accuracy can be increased. While navigating, whenever the node fails to locate via landmark-based localization, the visual odometry, ranging and Kalman filter system takes over. The visual odometry, ranging and Kalman filter combination localizes by estimating the frame-to-frame, ranging and IMU relative poses and integrating them over time. The node will resume landmark-based localization as soon as an image is found and matched in the landmark database.

At step 606, the visual sensor pose from step 603 is used to estimate a search region. The landmark database provides landmarks that are within this search region. A radius for the three-dimensional search region is obtained automatically via the uncertainty based on the estimated, tree drift rate. Subsequently, all the landmarks acquired at the positions within the obtained search region are selected from the landmark database to form a landmark cache. For efficient landmark retrieval, the landmark databases index to be a prebuilt vocabulary tree. At step 608, images from the front and back stereo pairs are matched to the vocabulary tree indexed landmark cache to obtain a list of top ranked landmarks. These landmarks are subsequently refined by imposing and at the polar constraint. Finally, the embodiment utilizes the number of matched landmarks to characterize the matching score for each image, any image with the highest score that satisfies a predetermined threshold is returned as a successful match.

For efficiency, method 600 stores they mapped node indices at each layer in the tree for each landmark in the landmark database so that the visual word quantization need be performed only once.

Using this topology inference technique, all the readers its two locations already stored in the landmark database are identified successfully, regardless of the complexity of the environment or the number of overlaps along the systems path during the process of landmark collection. Once a re-visit or an overlapped image pair is found, all the frames between the reference frame and the current frame will be used for optimization using a bundle adjustment.

Bundle adjustment is used to find optimized estimates of poses for the landmark images and the corresponding three-dimensional landmarks. Specifically, given a set of N frames starting at time t=1, the final cost function e is expressed as:

$$e(P_{t=1,\ldots,N}, X^m, X^s) = \Sigma_{t=1}^N e_t(P_t, X^{tm}, X^{ts})$$

where $X^m = X^{1m} U \ldots U X^{Nm}$ and $X^s = X^{1s} U \ldots U X^{Ns}$

Bundle adjustment minimizes the final cost function e over the set of N frames by solving the camera poses $P_i$ and the 3D feature coordinates $X_j$:

$$\arg\min_{P_i, X_j} e(P_{i=1,\ldots,N}, X_{j=1,\ldots,K}) \qquad (5)$$

Bundle adjustment is used to find optimized estimates of poses for the landmark images and the corresponding three-dimensional landmarks. Specifically, given a set of N frames starting at time t=1, the final cost function e is expressed as:

$$e(P_{t=1,\ldots,N}, X^m, X^s) = \Sigma_{t=1}^N e_t(P_t, X^{tm}, X^{ts})$$

where $X^m = X^{1m} U \ldots U X^{Nm}$ and $X^s = X^{1s} U \ldots U X^{Ns}$

Bundle adjustment minimizes the final cost function e over the set of N frames by solving the camera poses $P_i$ and the 3D feature coordinates $X_j$:

$$\arg\min_{P_i, X_j} e(P_{i=1,\ldots,N}, X_{j=1,\ldots,K}) \quad (5)$$

Solving the bundle adjustment equation is a linear minimization problem, which is solved using the iterative Levenberg-Marquardt non-linear least-squares approach. During minimization, the initial values are taken from the estimated poses from the multi-stereo fusion performed in step 603. Bundle adjustment provides a globally optimized landmark.

At step 610, the method 600 generates the visual sensor location and pose.

At step 614, the method 600 utilizes the range information from step 612 to update a range bias. The range bias value with each range node is stored as part of the states in the Kalman filter and is initialized by prior values estimated beforehand. Then, for each input range measurement, including only distance information, the error-state predictive filter forms a prediction for that measurement by comprising into the states the stored value including the range bias value. The state values including range bias values thus can be updated by utilizing the derived Jacobian and the difference between input measurements and prediction formed by the filter.

At step 618, the method 600 utilizes the IMU information (e.g., gyroscope, velocity, acceleration) from step 616 to update a gyroscope bias vector, an accelerometer bias vector, and the velocity vector. The gyroscope bias and accelerometer bias values are stored as part of the states in the filter. The filter uses IMU mechanism method to utilize all the IMU information received between two time steps for generating a filter state prediction and forming the state transition matrix among all state values including the bias values. The gyroscope bias and accelerometer bias values thus can be updated.

At step 620, the method 600 creates a measurement input for the error-state predictive filter. This measurement input comprises the range bias, camera location, gyroscope by a sector, velocity vector, accelerometer bias sector, and ground to camera orientation.

The foregoing embodiments, utilized ranging information, IMU information, and visual odometry augmented with landmark matching to perform navigation. In alternative embodiments, ranging information may be excluded and navigation performed using IMU information and visual odemetry augmented with landmark matching. In still further embodiments, navigation can be performed using ranging information, IMU information and visual odometry without landmark matching.

In a further embodiment of the invention, objects within the environment may be tracked and their orientation monitored using the visual sensors of the node. For example, in a helmet mounted node, the forward visual sensors may be used to determine the pose of a weapon or other object held by a user.

Figure 7:
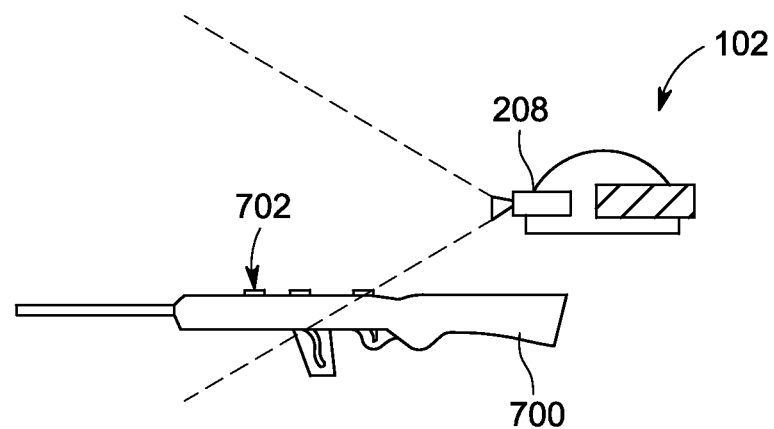
FIG. 7 depicts a scenario for tracking an object within an environment in which a node in accordance with an embodiment of the invention.
Figure 8:
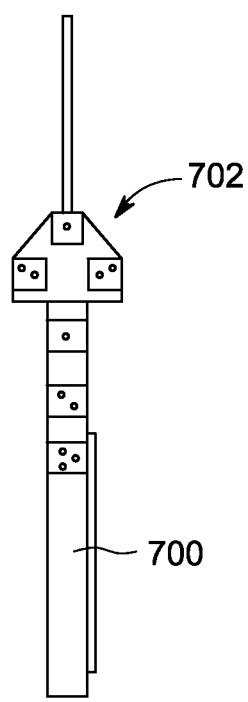
FIG. 8 depicts a top view of the object of FIG. 7.

As shown in FIG. 7, multiple markers (i.e., fiducials) 700 are mounted on an object (e.g., weapon) 702. By detecting the markers 700 in the video frames from the two forward-facing visual sensors 208, the node 102 estimates six degrees of freedom (6-DOF) pose of the weapon. FIG. 8 depicts a top view of the object 700 comprising a plurality of markers 702. The markers 702 are patterned to assist in marker recognition and orientation computations.

Fiducial detection is well-studied in augmented reality. However, existing approaches are not reliable enough to handle the difficulties inherent in a combat application, including significant lighting changes, severe foreshortening, and the limited fiducial size. The embodiment of the invention relies on curve extraction. This leads to its robustness under non-uniform lighting conditions and its computational efficiency. The embodiment can execute at 60 Hz with 640×480 images on a single-core CPU.

Figure 9:
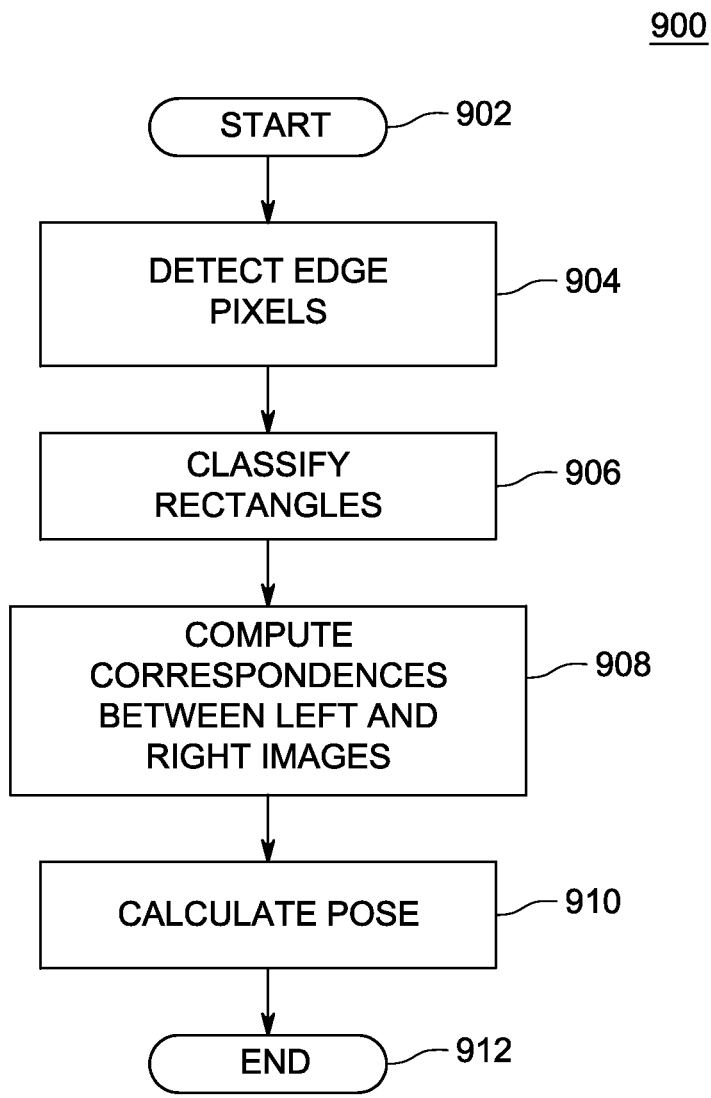
FIG. 9 depicts a flow diagram of a method for tracking the object of FIGS. 7 and 8 in accordance with one embodiment of the invention.

FIG. 9 depicts a flow diagram of a method 900 of computing pose of an object within the environment in accordance with one embodiment of the invention. The method 900 represents one implementation of the object tracking module 420 of FIG. 4. The method 900 begins at step 902 and proceeds to step 904 wherein edge pixels are detected with non-maximum suppression on gradient and linked into curves. Rectangles are detected from the curves. At step 906, each rectangle is classified into one of the fiducials or non-fiducial based on the configuration of its inside curves. Each rectangle is also classified according to the rectangle's internatl pattern (e.g., inside black blobs/dots), which are detected with thresholding. The more confident classification result is output.

The fiducials are detected in both of the left and right images from the forward-facing visual sensors. At step 908, the method 900 computes correspondences between the left and right images. Based on the correspondences between the detected 2D points of the fiducials' corners and their 3D points, the method 900 uses a well-known generalized 3-point algorithm to calculate the pose of the object at step 910. The method 900 ends at step 912.

Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. Apparatus for providing three-dimensional navigation for a node comprising:
    an inertial measurement unit (IMU), coupled to the node, for providing gyroscope, acceleration and velocity information, collectively IMU information;
    a ranging unit, coupled to the node, for providing distance information relative to at least one reference node;
    at least one visual sensor, coupled to the node, for providing images of an environment surrounding the node wherein features are tracked in the images in adjacent frames and combined with the IMU information to produce relative pose measurements;
    a landmark matcher for generating an error state derived from comparing at least one image to a visual landmark within the environment;
    a preprocessor, coupled to the inertial measurement unit, the ranging unit, the at least one visual sensor and the landmark matcher for fusing the relative pose measurements, the error state from the landmark matcher, the distance information and the IMU information to generate an error state comprising local and global information; and
    an error-state predictive filter, coupled to the preprocessor, for processing the error state, which comprises local and global information to produce a continually updated three-dimensional pose of the node,
    wherein the error-state predictive filter localizes the node by estimating frame to frame information, estimating ranging information and estimating IMU information and integrating the estimates over time when the node fails to localize via the landmark matcher.

2. The apparatus of claim 1 wherein the at least one reference node is at least one of an anchor node or mobile node.

3. The apparatus of claim 1 wherein the at least one visual sensor comprises at least one stereo camera.

4. The apparatus of claim 1 wherein the visual landmark is recalled from a landmark database.

5. The apparatus of claim 4 wherein the landmark database is created by scanning the environment with a sensor to create a point cloud representation of the environment.

6. The apparatus of claim 1 further comprising an output processor for generating, in response to the pose, at least one of tracking information or an augmented reality display.

7. The apparatus of claim 1 wherein the error state further comprises range bias, camera location, gyroscope bias vector, velocity vector, accelerometer bias vector, and ground to camera orientation.

8. The apparatus of claim 7 wherein the error-state predictive filter produces the three dimensional pose when image information is inaccurate or not available.

9. The apparatus of claim 1 wherein the apparatus is attached to a helmet.

10. The apparatus of claim 1 wherein the error states comprise camera location, gyroscope bias vector, velocity vector, accelerometer bias vector, and ground to camera orientation.

11. The apparatus of claim 1 wherein the error- state predictive filter produces the three dimensional pose when image information is inaccurate or not available.

12. A method, executed by a processor, for generating a pose of a node, the method comprising:
   using an inertial measurement unit coupled to the node for providing gyroscope, acceleration and velocity information, collectively IMU information, using a ranging unit coupled to the node for providing distance information relative to at least one reference node, and using at least one visual sensor coupled to the node for providing images of an environment surrounding the node, wherein features are tracked in adjacent frames in the images and combined with the IMU information to produce relative pose measurements;
   generating, by a landmark matcher, an error state derived from comparing at least one image to a visual landmark within the environment;
   fusing the relative pose measurements, the error state from the landmark matcher, the distance information and the IMU information to generate an error state comprising local and global information; and
   processing, by the processor, the error state, which comprises local and global information, within an error state predictive filter to produce a continually three-dimensional pose of the node,
   wherein the error state predictive filter localizes the node by estimating frame to frame information, estimating ranging information and estimating IMU information and integrating the estimates over time when the node fails to localize via the landmark matcher.

13. The method of claim 12 wherein the error state further comprises camera location, gyroscope bias vector, velocity vector, accelerometer bias vector, and ground to camera orientation.

14. The method of claim 12 wherein the error state predictive filter produces the three dimensional pose when image information is inaccurate or not available.

* * * * *